United States Patent Office 2,907,748
Patented Oct. 6, 1959

2,907,748
CURING EPOXY RESINS

David J. Lieb, Bainbridge, N.Y., assignor to The Borden Company, a corporation of New Jersey No Drawing. Application February 19, 1957
Serial No. 641,049

4 Claims. (Cl. 260—47)

This invention relates to improvements in curing agents for epoxide resins and provides an epoxide resin composition having improved setting and curing characteristics at room temperature.

The invention makes possible a pronounced decrease in the temperature rise in curing such resins and, in a representative product, prolongs the usable period for the mixed resin and curing agent from 20 minutes to 8 hours.

The expression "epoxide resin" as used herein means a glycidyl ether formed by the reaction of a polyhydric aromatic or aliphatic compound with a compound having a glycidyl radical

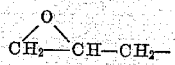

or a radical capable of forming a glycidyl radical under the conditions of the condensation reaction, said resin having an epoxy equivalency greater than unity. By the term "epoxy equivalency," we mean the average number of 1,2 epoxy groups

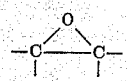

contained in the molecule of the glycidyl ether.

Epoxide resins have been subjected heretofore to cure with various amines including primary polyamines and tertiary amines. The present invention is based on the discovery that marked and unexpected improvements in curing characteristics are obtained by using certain primary polyamines and hydroxylated tertiary amines in admixture.

The present invention provides, therefore, a curing agent for epoxide resins which comprises a homogeneous mixture of a primary polyamine with a hydroxylated tertiary amine that is miscible with the primary amine. The invention further provides an epoxide resin composition obtained by curing an epoxide resin in contact with such mixture.

For convenience, the primary polyamines and tertiary amines are sometimes hereinafter referred to together as a "mixed amine curing agent."

The mixed amine curing agent contains approximately 5%–40% of the polyamine on the weight of the mixed amines. Such amine mixture is used in the proportion of about 5–20 parts for 100 of the epoxide resin to be cured. When the mixed amines are diethylene-triamine and diethylaminoethanol, their proportions are within the range of diethylenetriamine 10–20 parts and diethylaminoethanol 90 to 80 parts. With a proportion of 10 to 15 parts of the mixed amines for 100 parts of an epoxide resin having an epoxide value (i.e. the number of epoxy groups expressed as gram equivalents per 100 grams of resin) of the order 0.5, a particularly valuable combination is obtained. Such a mixture has a usable life of at least several hours at 15° to 25° C., will gel overnight at 15° C. or above, and shows only a very small temperature rise on curing mixes as large as 50 pounds.

Among the primary polyamines which I use as a component of the mixed amine curing agent are alkylene polyamines such as ethylenediamine, diethylenetriamine, triethylenetetramine and tetraethylenepentamine. Among the tertiary hydroxy amines that we use are diethylaminoethanol, 1 - diethylaminopropanol, 2 - diethylaminopropanol and 3-diethylaminopropanol.

The mixed amine curing agents have specific advantages over the separate components themselves. Tertiary amines harden epoxide resins only very slowly whereas primary polyamines, such as ethylenediamine and diethylenetriamine, give a very rapid reaction with an inconveniently short usable life and high heat release. The desirable feature of the above mentioned mixtures of amines is that epoxide resins may be cured, with the mixed amine, at room temperature and that negligible temperature rise is produced in large and small sizes. Thus the cure of an epoxide resin may be obtained at about 20° C. without heating or at higher temperatures, as up to 150° C., care being taken that the temperature used is not so high as to cause charring of the resinous product.

One important application of the present mixed amine curing agent is in the preparation of press tools for sheet metal pressings. Large castings are made from resin and filler. The very small heat release obtained with the mixed amine curing agent is particularly important.

Epoxide resins incorporating the mixed amine curing agents of the present invention are very useful for adhesive purposes since a cure is obtainable at room temperature, without pressure, to give excellent bonding of various combinations of materials including high strength metal to metal bonds.

The epoxide resin used in the present invention is any epoxide resin that is polymerizable by any alkylene-polyamine. They include those resins derived by condensation of epichlorhydrin with phenol-ketone condensates, such as diphenylolpropane [bis(4-hydroxyphenyl)-2,2-propane] and phenol-aldehyde condensates such as 4,4'-dihydroxydiphenyl methane. Another such resin that I use is the condensation product of epichlorhydrin with glycerine. Those selected are suitably mobile liquids at the temperature of incorporating the mixed amine curing agent, in order to facilitate mixing.

Various compounding ingredients may be mixed with the epoxide resin subjected to cure, including compatible resins, diluents or plasticizers and fillers.

The glycidyl ethers of dihydric phenols may be made by heating, at 50°–150° C., 1 mole of a dihydric phenol with from 1–6 moles of epichlorhydrin and 1–6 moles of sodium hydroxide or other alkaline condensation catalyst in the form of an aqueous solution.

The nature of the glycidyl ethers of polyhydric phenols can best be understood from the following descriptions of the preparation of two particular epoxide resins A and B, proportions here and elsewhere herein being expressed as parts by weight unless specifically stated to the contrary.

*Resin A.*—An epoxide resin was prepared by heating a solution consisting of 11.7 parts of water, 1.22 parts of sodium hydroxide and 13.38 parts of diphenylolpropane to 70° C., cooling the heated mixture to 45° C., and then adding 14.06 parts of epichlorhydrin. After 1 to 2 hours there was added a solution of 5.62 parts of sodium hydroxide in 11.7 parts of water over a period of 15 minutes. The temperature rose to 65° C. After removing the by-product sodium chloride, by washing with water, the product was dried in vacuo to a final temperature of 80° C. at a pressure of 25 mm. of mercury. The product thus obtained was a highly viscous liquid resin.

Resin B.—A solution was prepared containing 376 parts of phenol together with 154.6 parts of boron-trifluoride-ethyl etherate. To this was then added a slurry of 63.2 parts of paraformaldehyde in 220 parts of dioxane. The paraformaldehyde slurry was added in small increments to the stirred solution over a period of 3½ to 4 hours with the temperature maintained at from 30° to 10° C. At the end of this time, the material was neutralized with sodium carbonate and the solvent removed by evaporation. There was thereby obtained a phenol-aldehyde condensate in an appropriate stage of condensation. Of the material so prepared, 263 parts were then reacted with 365 parts by weight of epichlorhydrin in the presence of 210 parts by weight of a 50% sodium hydroxide solution in water, the epichlorhydrin and alkali being added simultaneously. In this reaction, the chlorine combined with the alkali to yield a precipitate of sodium chloride which was insoluble in the fluid. There resulted from this reaction approximately a 100% yield of a permanently fusible, free-flowing resin, capable of being thermoset in the presence of curing agents to yield a set resin of very excellent physical properties.

The two resins had the following properties:

| Resin | Molecular Weight | Average Number of Epoxy Groups per Molecule |
|---|---|---|
| A | 370 | 1.85 |
| B | 400 | 2.0 |

The glycidyl ethers manufactured from bis-phenols are complex mixtures which are believed to consist predominantly of molecular species which may be represented by the formula:

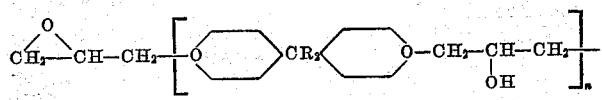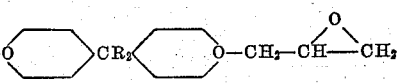

wherein $n$ represents 0 or any integer as within the range 1–10 or somewhat more and $R_2$ represents two hydrogens, two alkyl groups such as methyl, ethyl, or propyl, two oxyhydrocarbon groups such as phenylol, or one each of two such units. By varying the ratio of epichlorhydrin to bis-phenol, the average value of $n$ for the mixture as a whole may be altered and a range of products of different average molecular weights can be obtained. The bis-phenols are, more exactly, bis(4-hydroxyphenyl)-alkanes.

Various compounding ingredients may be mixed with the epoxide resin subjected to cure, including compatible resins, diluents or plasticizers and fillers.

The following examples are given in order to illustrate the invention.

For the purpose of the examples, the following mixed amine curing agents were used:

Curing agent C:                                          Parts
    Diethylenetriamine _____ 10
    Diethylaminoethanol _____ 90
Curing agent D:
    Diethylenetriamine _____ 20
    Diethylaminoethanol _____ 80

Example 1

7.5 gm. of curing agent C were stirred into 50 gm. of resin B at 27° C. and immersed in a constant temperature bath at 27° C. The mix was usable for a period up to 8 hours and there was virtually no heat release (temperature rise), but it gelled within 24 hours to give a solid, hard product.

In contrast, when 3 gm. of diethylenetriamine alone were stirred into 50 gm. of resin B at 27° C. and immersed in a water bath at 27° C., the mix was usable only for a period up to 20 minutes and gelled after 30 minutes by which time the temperature of the mix had reached 100° C.

Example 2

3″ x ½″ test tubes were coated internally with a silicone release agent (any one is satisfactory) and this was baked on. The test tubes were then filled with a mixture of 100 parts of resin A and 12 parts of curing agent D which was then allowed to gel for 16 hours at 20° C. and finally cured at 120° C. for 1 hour.

For comparison, similar tubes were filled with a mixture of 100 parts of resin A and 6 parts of diethylenetriamine and this also was allowed to gel for 16 hours at 20° C. and finally cured at 120° C. for 1 hour.

For test purposes, the cured castings were cut into lengths of approximately 1″ which weighed 3 gm. Water uptake at 27° C. was measured after 1 day and after 12 days. The results are given below:

| Curing Agent Used | Parts of Curing Agent for 100 Parts of Resin | Water Uptake, percent, at 27° C. | |
|---|---|---|---|
| | | 1 day | 12 days |
| Curing Agent D | 12 | 0.06 | 0.35 |
| Diethylenetriamine | 6 | 0.09 | 0.30 |

This example shows that the combination of curing agent D and resin A, when fully cured, gives a water uptake no higher than the same resin cured with diethylenetriamine which, however, gives an inconveniently short usable life and high heat release.

Example 3

The procedure of Example 1 is followed except that the monoglycidyl ether of glycerine was substituted on an equal weight basis for resin B and the whole cured with the curing agent C by the procedure described.

The invention also includes a process for the production of a hard, resinous product which comprises effecting a cure of an epoxide resin by the action of the mixed amine curing agent, with or without the aid of heat.

It is to be understood that it is intended to cover all changes and modifications of the examples of the invention herein chosen for the purpose of illustration which do not constitute departures from the spirit and scope of the invention.

What is claimed is:

1. In polymerizing an epoxide resin that is polymerizable by an alkylene polyamine and is selected from the group consisting of glycidyl ethers of polyhydric phenols and polyhydric alcohols, the process which comprises mixing 100 parts of the resin with about 5–20 parts of a curing composition consisting essentially of a homogeneous mixture of alkylene polyamine and a beta-monohydroxy tertiary aliphatic monoamine in the proportion of approximately 5%–40% of the polyamine on the total weight of amines, and maintaining contact between the resins and the curing agent without heating until polymerization is effected.

2. An epoxide resin made by the process of claim 1 and comprising the reaction product of an epoxide resin that is polymerizable by an alkylene polyamine and is selected from the group consisting of glycidyl ethers of polyhydric phenols and polyhydric alcohols in the proportion of 100 parts with about 5–20 parts of a curing composition consisting essentially of an alkylene polyamine and a beta-monohydroxy tertiary aliphatic monoamine in the proportion of approximately 5%–40% of the polyamine on the total weight of amines.

3. The product of claim 2, the epoxide resin being a glycidyl ether of a bis(4-hydroxyphenyl)alkane, wherein both 4-hydroxyphenyl groups are attached to the same carbon atom.

4. The product of claim 2, the epoxide resin being a glycidyl ether of glycerine.

References Cited in the file of this patent

UNITED STATES PATENTS

| | | |
|---|---|---|
| 2,723,241 | De Groote et al. | Nov. 8, 1955 |
| 2,783,214 | Homan | Feb. 26, 1957 |